United States Patent [19]

Wilson

[11] 4,439,491
[45] Mar. 27, 1984

[54] OXIDATION RETARDANT FOR GRAPHITE

[75] Inventor: William F. Wilson, Elizabethton, Tenn.

[73] Assignee: Great Lakes Carbon Corporation, New York, N.Y.

[21] Appl. No.: 442,651

[22] Filed: Nov. 18, 1982

[51] Int. Cl.³ .................. B32B 9/00; C09K 15/32
[52] U.S. Cl. .................. 428/408; 252/502; 252/506; 252/400 A; 428/367; 204/290 R
[58] Field of Search .......... 252/400.1, 400.21, 400.4, 252/400.52, 400.2, 502, 506; 204/290 R, 291, 292; 428/408, 367; 373/88

[56] References Cited

U.S. PATENT DOCUMENTS

| | | | |
|---|---|---|---|
| 2,685,539 | 8/1954 | Woodburn et al. | 117/169 |
| 2,685,540 | 8/1954 | Woodburn et al. | 117/169 |
| 2,685,541 | 8/1954 | Woodburn et al. | 117/169 |
| 2,685,542 | 8/1954 | Woodburn et al. | 117/169 |
| 2,906,632 | 9/1959 | Nickerson | 106/56 |
| 2,949,430 | 8/1960 | Jorgensen | 252/502 |
| 3,029,167 | 4/1962 | Carlson | 117/228 |
| 3,174,872 | 3/1965 | Fisher | 106/56 |
| 3,342,627 | 9/1967 | Paxton | 117/113 |
| 3,351,477 | 11/1967 | Wallouch | 106/56 |
| 3,418,255 | 12/1968 | Brown, Jr. et al. | 252/397 |
| 3,484,183 | 12/1969 | Dickson et al. | 252/502 X |
| 3,510,347 | 5/1970 | Strater | 117/169 |
| 3,814,699 | 6/1974 | Baldieri | 252/397 |
| 3,852,107 | 12/1974 | Lorkin et al. | 252/502 |
| 4,188,279 | 2/1980 | Yan | 204/294 |
| 4,292,345 | 9/1981 | Kolesnik et al. | 252/506 |

*Primary Examiner*—Thurman K. Page
*Attorney, Agent, or Firm*—Adrian J. Good

[57] ABSTRACT

Carbon or graphite is protected against oxidation by application of a solution comprising monoammonium phosphate, zinc orthophosphate, phosphoric acid, boric acid, cupric oxide, wetting agent in water.

4 Claims, No Drawings

OXIDATION RETARDANT FOR GRAPHITE

BACKGROUND OF THE INVENTION

One of the most critical applications of graphite is as electrodes for arc melting of steel. During the past 20 years the use of electric furnaces for melting steel has grown from a small volume specialty process to a high volume process with probably the lowest production costs of any of the recognized metallurgical processes. The process typically consumes from 10–12 pounds of graphite electrode for each ton of steel produced for about 8% of the total production cost.

During operation of electric arc steel furnaces, the graphite electrodes are subject to mechanical, chemical and electrical stresses of such severity, that particularly for ultra high powered furnaces, only graphite of very high quality can be used. The electrodes are subject to the mechanical stresses from falling scrap being melted, from the inductance caused by the high AC current and subject to oxidation due to the temperature reached, which will range up to the sublimation temperature of over 3000° C.

Although pure graphite is one of the most inert and least reactive materials known at high temperatures, oxidation is a highly significant cause of deterioration of strength and loss of material, thus retardation of the oxidation reactions could be highly beneficial in lowering consumption, both by direct oxidation and by lessening breakage caused by oxidation-induced loss of strength.

During operation of an electric arc furnace, normally three electrodes are used, each of which is connected to one phase of the power supply through a metal clamp, and as the electrode is consumed, additional sections are added at the top and the column lowered to the operating level in the furnace. Although it is generally found that oxidation retardants are ineffective above about 1200° C., any improvement, even at lower temperatures, is welcome and can significantly reduce electrode consumption.

DESCRIPTION OF THE PRIOR ART

U.S. Pat. Nos. 2,685,539, 2,685,540, Woodburn et al., Aug. 3, 1954 describe an aluminum phosphate oxidation retardant for carbon and graphite bodies and a method for producing them.

U.S. Pat. No. 2,685,541, Woodburn et al., Aug. 3, 1954, describes calcium phosphate oxidation retardants.

U.S. Pat. No. 2,685,542, Woodburn et al., Aug. 3, 1954, describes alkali metal phosphate oxidation retardants.

U.S. Pat. No. 2,906,632, Nickerson, Sept. 29, 1959, discloses an oxidation retardant solution of ammonium phosphate, zinc chloride, and boric acid.

U.S. Pat. No. 3,029,167, Carlson, Apr. 10, 1962, discloses the use of salts of organophosphoric acids as carbon and graphite impregnants.

U.S. Pat. No. 3,174,872, Fisher, Mar. 23, 1965, discloses the addition of boric acid-metal oxide and phosphate to a carbon mix before baking to form an oxidation-resistant glass.

U.S. Pat. No. 3,342,627, Paxton et al., Sept. 19, 1967, discloses the use of an inorganic phosphate salt or ceramic as an oxidation retardant.

U.S. Pat. No. 3,351,477, Wallouch, Nov. 7, 1967, discloses the use of zinc oxide, boric acid and phosphoric acid as an oxidation retardant.

U.S. Pat. No. 3,510,347, Strater, May 5, 1970, discloses calcium and aluminum phosphates in specific ratios as oxidation retardants.

U.S. Pat. No. 3,814,699, Baldieri, June 4, 1974, discloses the use of phosphoric acid, a salt, an oxide or hydroxide of a Group II metal, boric acid or sodium tetraborate decahydrate, and nitric acid, sodium nitrite, or sodium carbonate.

U.S. Pat. No. 3,881,039, Baldieri, Apr. 29, 1975, a division of the above, discloses a solution of an oxide or hydroxide of a Group II metal, nitric acid and boric acid as an oxidation retardant.

U.K. No. 1,201,702, Societe Le Carbone Lorraine, Aug. 12, 1970, discloses an oxidation retardant process by first impregnating carbon with boric acid or ammonium phosphate, then with a metal, e.g. copper.

DT No. 1,671,167, Tatabanyai Aluminiumkoho, Nov. 27, 1967, discloses an impregnant comprising furfural alcohol, anthracene oil, phosphoric acid and titanium ethyl ester as an electrode impregnant.

J53008-608, Ibigawa Electric K.K., Jan. 26, 1978, discloses aluminum phosphates as graphite oxidation retardants.

DETAILED DESCRIPTION OF THE INVENTION

Oxidation retardant solutions have been used by graphite manufacturers to treat electrode sockets for many years. There have also been many attempts to use these solutions as oxidation retardants on the total graphite electrode; however, these have been unsuccessful in the past due to a variety of shortcomings including ineffectiveness, corrosion of the clamps, and high contact resistance between the electrode and the clamps caused by the use of a glassy type of oxidation retardant. Corrosion is often caused by the use of a solution containing halogen ions such as hydrochloric acid or its salts.

A number of solutions were evaluated for contact resistance, corrosion, and oxidation resistance by treating various samples of graphite by various several application means. The samples were dried and tested for the several parameters involved.

Samples of two different electrode graphite types were treated by soaking them with various oxidation retardant solutions. The weight pickups were measured wet, partly air-dried, and dried at 800° C. The samples were then oxidized under controlled conditions in a Thermo Gravimetric Analyzer (TGA) furnace for their effectiveness against oxidation.

Contact resistance of the samples treated with the oxidation retardant solutions was determined while the samples were in an Instrom universal testing machine with 4-in.$^2$ contact areas at various pressures.

Copper corrosion was measured on copper plates bolted to graphite samples which were treated with the oxidation retardant solutions. The samples were then heated to 500° C. in the TGA furnace.

Two-inch cubes of the two graphite materials were used for determining optimum soak times for maximum pickup of the oxidation retardant solution.

Two different graphite materials were treated with oxidation retardant solutions and 26 samples of each were carefully weighed. Three samples were set aside for control in the oxidation testing; three samples were treated for each solution. Samples were weighed after treatment to obtain percent wet pickup. Treated samples were then air-dried for several days before testing. One sample for each solution was set aside to use in case the two remaining samples were unreasonably different or a TGA run was lost. Two samples for each solution were weighed just before testing to obtain the percent air-dried pickup. Treated samples in the control samples were then heated individually in the TGA furnace in a nitrogen atmosphere to 800° C. At this time, the 800° C. baked percent pickup was obtained. After temperature stabilization, the nitrogen atmosphere was replaced with dry air. The run to determine the oxidation weight loss was continued until a one-gram weight loss was measured. Table 1 shows the wet, air-dried, in 800° C. baked pickup weights, the weight loss for individual samples and averages for each group. With their oxidation resistance index, calculated as follows: Oxidation $$\text{Resistance Index } (ORI) = \frac{\% \text{ wt. loss of treated samples}}{\% \text{ wt. loss of control}} \times 100.$$

TABLE 1
OXIDATION RESISTANCE OF STANDARD GRAPHITE

| Solution | % Pickup Wet | Air-Dry | 800° C. | Oxidation Loss Wt. % | ORI |
|---|---|---|---|---|---|
| | | A - Graphite | | | |
| Ex 1 sol. | 8.89 | 4.02 | 1.54 | 2.02 | 15.17 |
| #2 sol. | 5.89 | 3.92 | 1.94 | 2.81 | 21.10 |
| #3 sol. | 11.09 | 7.46 | 3.33 | 3.68 | 27.63 |
| #4 sol. | 7.58 | 3.79 | 2.62 | 5.11 | 38.36 |
| #5 sol. | 6.70 | 2.25 | 1.33 | 5.19 | 38.96 |
| #6 sol. | 6.87 | 2.12 | 1.16 | 5.74 | 43.09 |
| Control | | | | 13.32 | |
| | | B - Graphite | | | |
| Ex 1 sol. | 13.16 | 4.41 | 1.83 | 2.10 | 13.08 |
| #2 sol. | 5.23 | 4.27 | 2.50 | 3.43 | 21.37 |
| #3 sol. | 10.99 | 8.40 | 4.20 | 3.69 | 22.99 |
| #4 sol. | 7.72 | 3.34 | 2.36 | 5.07 | 31.61 |
| #5 sol. | 7.09 | 2.59 | 1.48 | 5.83 | 36.32 |
| #6 sol. | 7.53 | 2.43 | 1.30 | 7.04 | 43.84 |
| Control | | | | 16.05 | |

In these trials, my solution was superior to the other five solutions in terms of percentage graphite loss. The six oxidation retardants ranked in the following order:
1. Ex 1 solution
2. Zinc phosphate (U.S. Pat. No. 3,351,477)
3. Cobalt phosphate-phosphoric acid
4. Aluminum phosphate (U.S. Pat. No. 2,685,539)
5. Ammonium phosphate-zinc chloride (U.S. Pat. No. 2,906,632)
6. Ammonium phosphate-cobaltous chloride-ethanol Table 2 shows the above formulations:

TABLE 2
SOLUTIONS USED, BY WT. PERCENT

| | Ex 1 | #2 | #3 | #4 | #5 | #6 |
|---|---|---|---|---|---|---|
| Monobasic Ammonium Phosphate $NH_4H_2PO_4$ | 19.8 | | | | 20.84 | 17.75 |
| Zinc orthophosphate $Zn_3(PO_4)_2$ | 3.5 | 21.7 | | | | |
| Phosphoric acid $H_3PO_4$ (85%) | 15.3 | 50.3 | 50.3 | 10.35 | | |
| Boric acid $H_3BO_3$ | 0.9 | 0.1 | | | 0.93 | |
| Cupric oxide CuO | 0.3 | | | | | |
| Dowfax 2A1 45% sol. (Dow Chem.) | 1.0 | 1.0 | 1.0 | 1.0 | 1.00 | 1.00 |
| Cobalt orthophosphate | | | 21.7 | | | |

TABLE 2-continued
SOLUTIONS USED, BY WT. PERCENT

| | Ex 1 | #2 | #3 | #4 | #5 | #6 |
|---|---|---|---|---|---|---|
| $Co_3(PO_4)_2-2H_2O$ | | | | | | |
| Zinc chloride $ZnCl_2$ | | | | | 8.23 | |
| Hydrochloric acid conc. HCl | | | | 7.47 | 1.50 | 1.50 |
| Cobaltous chloride hexahydrate $CoCl_2.6H_2O$ | | | | | | 12.25 |
| Ethanol $C_2H_5OH$ | | | | | | 8.00 |
| Aluminum hydroxide $Al(OH)_3$ | | | | 3.74 | | |
| Monoaluminum phosphate $Al(H_2PO_4)_3$ | | | | 37.36 | | |
| Water | 59.2 | 26.9 | 27.0 | 40.08 | 67.50 | 59.50 |

Thirty-six 2-inch by 2-inch by 6-inch samples, 12 each from three different graphite types, were cut for contact resistance testing of oxidation retardants. Both ends of the samples were machined to a smooth flat finish in the lathe. The sample ends were identified as "A" and "B" and the samples were numbered from 1 to 36. Two samples were paired together making 18 pairs, six each for each of the three graphite types studied.

The sample pairs were measured for their contact resistance between the "A" ends and "B" ends at 25, 50 and 100 psi to obtain values for untreated samples. Two "A" ends on one pair of each of the three types were painted with the four oxidation retardant solutions. After drying overnight, their contact resistances were measured. Data on untreated, one surface treated, and two surface treated samples is shown in Table 3 for each of the four oxidation retardants.

TABLE 3
CONTACT RESISTANCE OF OXIDATION-RETARDANT-TREATED GRAPHITE AT VARIOUS PRESSURES, OHMS × $10^{-5}$

| Treatment | | 25 psi | 50 psi | 100 psi |
|---|---|---|---|---|
| Ex 1 sol. - | control, untreated | .022 | .015 | .011 |
| | 2 surfaces | .040 | .022 | .012 |
| | 1 surface | .026 | .016 | .012 |
| #2 sol. - | control, untreated | .021 | .014 | .009 |
| | 2 surfaces | .032 | .021 | .014 |
| | 1 surface | .026 | .017 | .010 |
| #3 sol. - | control, untreated | .023 | .016 | .010 |
| | 2 surfaces | .262 | .180 | .120 |
| | 1 surface | 8.61 | 6.04 | 4.29 |
| #4 sol. - | control, untreated | .012 | .0065 | .0023 |
| | 2 surfaces | .108 | .076 | .025 |
| | 1 surface | .041 | .025 | .014 |
| #5 sol. - | control, untreated | .018 | .009 | .004 |
| | 2 surfaces | .044 | .022 | .011 |
| | 1 surface | .035 | .019 | .009 |

Several oxidation retardant solutions were tested to determine whether they would corrode copper at elevated temperatures. The samples from standard graphite were treated with oxidation retardant solutions and dried overnight in an oven at 110° C. Afterwards, a 2-in.$^2$ surface of copper plate was bolted in contact with a treated sample and heated in an atmosphere of air in the TGA furnace to 500° C. and held at this temperature for four hours. The percent weight loss of the copper plates after heating for each oxidation retardant solution tested is listed below:

TABLE 4

| | CORROSION WT. LOSS |
|---|---|
| Solution | % Wt. Loss of Cu Plate |
| Control | 0.03% |
| Ex 1 sol. | 0.07% |
| #2 sol. | 0.03% |
| #4 sol. | 0.90% |
| #5 sol. | 1.43% |

It should be particularly noted that the ammonium phosphate-zinc chloride solution with its high concentration of chloride ions is highly corrosive to copper.

EXAMPLE 1

A solution was made up as follows: monobasic ammonium phosphate, anhydrous 19.8%, zinc orthophosphate 3.5%, phosphoric acid 15.3%, boric acid 0.88%, cupric oxide 0.27%, Dowfax 2Al wetting agent, 45% solution 0.95%, and water 59.3%. The solution of water was put into a container and phosphoric acid was added and each compound was added, stirred in and dissolved before adding the next compound in the order of phosphoric acid, boric acid, monobasic ammonium phosphate, zinc orthophosphate, wetting agent and cupric oxide. The solution required vigorous stirring with heat of approximately 80° C. to go into solution.

The concentration of the various ingredients may each be varied considerably without seriously affecting the performance of the solution; thus an approximate concentration range as follows is contemplated:

| | |
|---|---|
| Monobasic ammonium phosphate | 10–30% |
| Zinc orthophosphate | 2–6% |
| Phosphoric acid | 8–25% |
| Boric acid | 0–2% |
| Cupric oxide | 0.1–1% |
| Wetting agent - Dowfax 2A1 (Other compatible wetting agents may also be used) | 0.1–1% |

Other salts yielding the ammonium phosphate, zinc, boric and copper ions may be used, in a number of combinations; however, I have found that for good conductivity, the presence of copper ions is highly desirable. Thus one might use monobasic zinc phosphate salt with a smaller amount of phosphoric acid in the formula and achieve a similar result.

The carbon or graphite article may be treated by a number of application procedures. The solution may be brushed or sprayed on the surface, the article may be dipped and soaked in the solution, or the solution may be applied by the normal process of impregnation, i.e. placing the article in a sealed chamber, evacuating the chamber, then bringing the impregnant into contact under pressure, e.g. at 100 psi.

While my solution is particularly useful on graphite arc furnace electrodes, it will be useful in many other areas such as for mold stock for metal casting, rocket nozzles, tundishes, furnace linings, Hall cell anodes, and many other areas where enhanced oxidation resistance of elemental carbon is desired.

I claim:

1. An oxidation retardant solution for carbon and graphite comprising a solution of monobasic ammonium phosphate, zinc orthophosphate, phosphoric acid, boric acid and cupric oxide.

2. The solution of claim 1 containing approximately
   10 to 30% of monobasic ammonium phosphate,
   2 to 6% of zinc orthophosphate,
   8 to 25% of phosphoric acid,
   0.1 to 1% of cupric oxide, and
   0.1 to 1% of wetting agent.

3. A graphite electrode treated with the solution of claim 1.

4. An oxidation retardant solution for elemental carbon comprising by weight, monoammonium phosphate, 19.8%; zinc orthophosphate, 3.5%; phosphoric acid, 15.3%; boric acid, 0.9%; cupric oxide 0.3%; wetting agent 1%; and water 59.2%.

* * * * *